Nov. 9, 1965  E. N. HARRISON  3,216,074
METHOD FOR MAKING SHAPED FOUNDRY ARTICLES
Filed Feb. 26, 1964

INVENTOR:
EDWARD NORMAN HARRISON
BY
Harrington A. Lackey
ATTORNEY

United States Patent Office 3,216,074
Patented Nov. 9, 1965

3,216,074
METHOD FOR MAKING SHAPED
FOUNDRY ARTICLES
Edward N. Harrison, P.O. Box 1206, Decatur Ga.
Filed Feb. 26, 1964, Ser. No. 347,446
12 Claims. (Cl. 22—193)

This is a continuation-in-part of patent application S. N. 51,632, filed August 24, 1960, now abandoned.

This invention relates to a product and method for making shaped foundry articles, and more particularly to the product and method for making models, patterns, core boxes, molds and molded products from different materials than those conventionally employed in the foundry art.

In the conventional practice of manufacturing shaped products, such as metal castings or molded plastic products, the first step is generally to make a model of the desired product of plaster of Paris, wood, metal, clay or any other convenient material. Such models are usually made in rough form in order to provide a prototype which will give the general effect of a finished article produced by plastic molding, metal casting or metal stamping.

One factor which makes product manufacturing difficult and sometimes expensive is the possibility that a model may be imperfectly made or changes in design may become necessary after the model has been completed. The process of altering the design of the model made from metal can become quite troublesome since additional welding, grinding, polishing or other types of metal treatment or finishing may be required, involving considerable time and expense.

In metal casting, after the model is made, a pattern is then produced from wood or metal in the same shape, but of slightly larger dimensions than the desired casting in order to allow for shrinkage. Molds are then made on the pattern by a conventional process employing green sand or platser sand, by a shell molding process, or by the Shaw process. Molten metal is then poured into the mold cavities to produce the desired cast metal product.

It is therefore an object of this invention to provide a method of making a model, pattern, core box, mold or molded product, which will overcome the difficulties enumerated above and which will be more economical in time and materials.

Another object of this invention is to provide a method of making a model, pattern, core box, mold or molded product employing identical processes and materials.

A further object of this invention is to provide a method of making a model, pattern, core box, mold or molded product by forming the desired configuration in a coherent workable or plastic mass of pellets and solidifying this mass into a hard, durable, shaped foundry article or device capable of making shaped products of great accuracy and quality.

Another object of this invention is to produce a shaped foundry article from magnetized steel shot.

Further objects and advantages of the invention will be apparent from the following description, taken in conjunction with the drawings, wherein.

Figure 3:
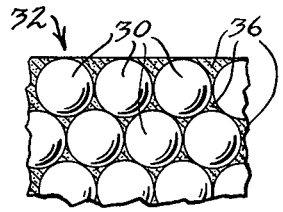
FIG. 3 is an enlarged fragmentary sectional elevation of one form of the invention incorporating magnetic balls.

This invention contemplates a method of making shaped foundry articles or devices, such as models, patterns, core boxes, molds or molded products, in which a plurality of pellets, or rigid bodies, which are dimensionally stable and temperature resistant, are deposited upon a substantially horizontal flat supporting surface, and held in a substantially workable mass having an exposed surface. These pellets may be of regular or irregular shape, non-magnetic or magnetic, but preferably adapted to form interstices between the pellets when held in a mass, so that they may be impregnated with a filler material or a bonding material. The pellets may be made of various types of materials, such as steel or other types of metal, plastics, glass or other types of ceramics. The preferred shape of the pellets is spherical, such as steel shot or balls, which provide a certain amount of fluidity to the mass while it is bonded or semi-bonded, so that it may easily yield to the desired shape formed by a templet or pattern forming tool.

The pellets are preferably contained in a mass at a desired depth by rigid walls around the periphery or sides of the mass.

If the pellets are magnetic, then they are held in coherent workable mass by the magnetic field. If the pellets are non-magnetic they are held in a workable mass by impregnating the interstices of the pellets with a filler material, and preferably a bonding material. The bonding material may be a cement of any of a variety of types. A preferred form of cement is a resin-sand mixture, preferably having a composition of less than 20% thermosetting resin, such as phenol-formaldehyde, the balance being sand, such as silica sand, and a wetting agent, if the resin is in powdered form. Of course, with resins in liquid form, no wetting agent is required.

Another preferred form of bonding agent or cementing material is a mixture of finely divided iron powder and a silica-resin composition within the above proportions. The iron powder assists in bonding magnetic pellets, when magnetized, since the iron powder is also magnetic. However, because of the tendency of the iron powder to "fuzz," a silica-resin cement is also needed in the mixture.

After the pellets and filler of bonding material are deposited to form a coherent workable mass, and a magnetic field is established, if the pellets are magnetic, then one or more templets is moved in prescribed geometric patterns or designs to form configurations in the exposed surface of the plastic mass in accordance with a predetermined design. Because of the nature of the material of the mass, and the accuracy of the alignment and setting of the templets, the configurations are also very accurate and well defined. After the configurations have been formed, the shaped material is bonded into a rigid mass by the setting of the cementing material or the magnetic field.

Another important feature of the invention is the impregnation of the exposed surface of the shaped mass with the cementing material after the configurations have been formed in order to form a very smooth solid surface. These smooth surfaces permit the making of foundry articles of close tolerances.

Although the term "shaped article or device" could include the final molded product, it primarily refers to a model, pattern, core box, or mold, which produces a shaped product, such as a pattern, mold, core, or molded product, respectively. Thus, if the shaped device is a pattern, then the shaped product is a mold. If the shaped device is a core box, then the shaped product is a core.

Figure 1:
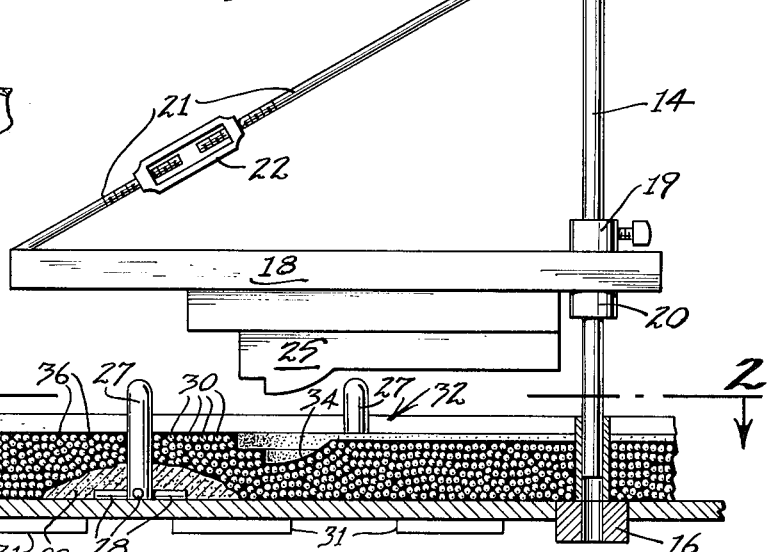
FIG. 1 is a fragmentary sectional elevation of an apparatus for carrying out the invention, with the templet in raised position.
Figure 2:
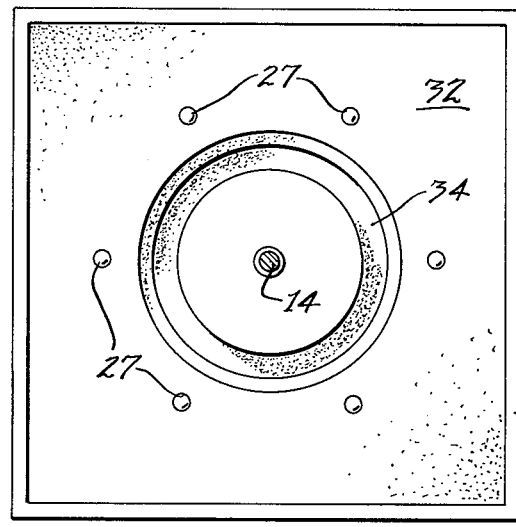
FIG. 2 is a section taken along the line 2—2 of FIG. 1.

One form of apparatus for carrying out this invention is disclosed in FIGS. 1 and 2. A flat metal table or platform 10 is supported in any conventional manner, not shown, in a substantially horizontal position. Mounted on platform 10 is a box frame 11 having square or rectangular side walls. Mounted above the platform 10 is a superstructure comprising a cross beam 12 supported in a stationary position by any convenient means, not shown. A vertical spindle 14 is mounted for rotational movement about an axis through the center of the platform by means of an upper bearing 15 supported by the cross beam 12, and a lower bearing 16 fixed in the center of the platform 10. The upper bearing 15 may be provided with adjustments for securing spindle 14 on a true vertical axis.

Extending laterally from and fixed to the lower portion of the spindle 14 is templete supporting arm 18. The arm 18 is fixed to the spindle 14 by any convenient means, such as an adjustable upper collar 19 and a lower collar 20. The outer end of the templet supporting arm 18 is further supported by a steel rod 21 having two axially aligned sections adjustably connected by the turnbuckle 22. The upper end of the rod 21 is fixed to the spindle 14 by means of a collar 23, while the lower end of the rod 21 is fixed to the outer end of the supporting arm 18, by any convenient means, such as by welding.

A templet 25 of any desired design for forming circumferential configurations in the material is fixed to and depends from the bottom of the supporting arm 18. It will be understood of course, that other types of templets or pattern forming tools may be employed in order to attain the desired configurations in the shaped mass or pattern material.

FIGS. 1 and 2 also disclose alignment posts or pins 27 having radial supporting fingers 28 extending from the base thereof to maintain the posts erect in order to assist in aligning the templet supporting arm 18 for forming certain patterns. The posts 27 and fingers 28 are rigidly bonded to the platform 10 by means of a cement, such as those previously mentioned, or a mixture of pellets, magnetic or non-magnetic, and cement. These posts 27 are accurately located for purposes of alignment and since they are the subject matter of another copending application, no further discussion is necessary.

One method of carrying out this invention is to deposit a plurality of magnetic steel shot 30 of the desired size into the box frame 11. The platform 10 is preferably of magnetized steel for magnetizing the shot 30, although the shot may be magnetized by any other convenient means, such as the magnets 31 disclosed in FIG. 1. Shot 30 may be shaped by hand into the general basic configuration of the desired mass 32, which initially does not have to have a level top surface. The templet supporting arm 18 is lowered so that the spindle 14 is rotatably supported in the bearings 15 and 16, and the templet 25 engages the plastic mass 32 at the desired depth. The templet 25 is then rotated about the axis of spindle 14 to form the circular impression or design 34 in the mass 32. After the templet 25 has completed its circular design, it is again raised or entirely removed from the superstructure 12, and the design 34 remains in the mass 32 as described by the templet 25, because of the magnetic bond between the shot.

FIG. 3 discloses a preferred form of the mass 32, in which the interstices between the magnetic steel balls 30 are filled with a filler material or cement material 36. It is particularly important that the interstices between the exposed surfaces of the balls 30 be filled or impregnated with the cement 36, until a very smooth surface is formed tangent to the exposed balls 30, so that the mating surface of the mass 32 as well as the pattern surface of the impression 34 are very smooth. This cement material 36 may be a resin-sand mixture having the following composition:

8½–20% thermosetting resin, such as phenol formaldehyde
¼–1½% finely divided molding clay
⅓–¾% wetting agent, such as kerosene
Balance graded silica sands.

After the shot 30 has been impregnated with the cement material 36 and the design 34 is formed, the cement 36 may be cured, if necessary, by heating at a temperature of 300–350° F., until the cement 36 has completely solidified. Such curing may be effected by removing the templet assembly and moving a hooded heating unit, such as a system of 500W strip-heaters, in position above the pattern material 32. The resultant solidified mass 32 constitutes the shaped article, such as a mold half. Since the shaped article, or mold half 32 incorporates pins 27 the opposite mold half must have mating holes for alignment with the pin 27 in order to accurately align the two mold halves for casting.

After the mass 32 is impregnated with the cementing material 36, but before it is cured, the movement of the templet 25 may be repeated if desired in order to further smooth the exposed surfaces.

It is important in the making of a shaped article incorporating magnetic pellets, or shot 30, that the templet 25 be of non-magnetic material, such as aluminum.

Since all of the interstices of the shot 30 are filled with a cured cement material 36, the shaped article 32 will remain rigidly bonded when it is removed from the box frame 11, and even after the magnetic field has been eliminated.

Another example of a filler or bonding material 36 is a mixture of finely divided iron powder with the resin-sand cement described above, or any other type of cement which will bond the steel balls 30 and form a smooth exposed surface.

Figure 4:
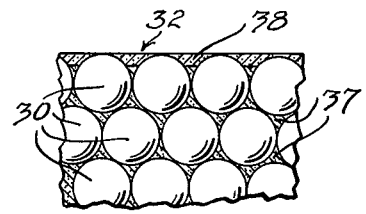
FIG. 4 is a view similar to FIG. 3 disclosing a modified form of the invention incorporating magnetic balls, with the exposed surface impregnated with a different material from the remainder of the interstices.

FIG. 4 discloses a mass or shaped article 32 in which all the interstices of the shot 30, except at the exposed surface, have been filled with a filler material 37, including a mixture or iron powder and a resin-said cement, similar to the cement material 36. The iron powder, also being magnetic, assists in bonding the magnetic shot 30 together. The exposed surface is made very smooth by a fine layer of cement 38, which may be a resin-sand composition similar to cement 36, but without the iron powder. By making the layer 38 tangent to the steel balls 30, the exposed surface of the mass 32 is made more rigid and durable than a coating extending beyond the tangential plane of the surface of the balls 30.

It is also within the scope of this invention to eliminate the filler material 37 from FIG. 4, and form a mass 32 of magnetized shot 30 with only the surface interstices impregnated with the cement material 38, with or without iron powder. In this process, the shaped article 32 when removed from the box frame 11 would be a thin rigid shell of silica-resin material, because the shot 30 would become de-magnetized and disintegrate so that the shot would no longer be a part of the shaped article 32.

Figure 5:
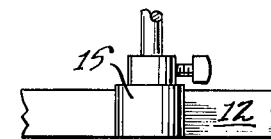
FIG. 5 is a view similar to FIG. 3 disclosing a modification of the invention incorporating non-magnetic balls.
Figure 5:
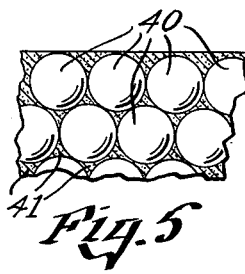

Although magnetic shot 30 has been described and disclosed in the above examples of the invention, it will be understood that non-magnetic balls 40 may be incorporated as disclosed in FIG. 5. However, in this case, the pellets or balls 40 must be mechanically bonded by cement material such as the resin-sand cement 41, which may have the same composition as impregnating surface material 38, without the iron powder.

Figure 6:
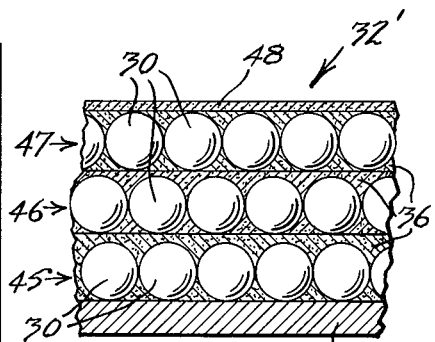
FIG. 6 is an enlarged fragmentary elevation of a modification of the invention built up in layers of impregnated magnetic balls.

FIG. 6 discloses a pattern material or mass 32′ incorporating successive layers 45, 46 and 47 of steel shot 30 impregnated with a bonding material, such as the iron powder-cement mixture 36. The successive layer construction, disclosed in FIG. 6, is particularly valuable where shaped articles of greater thickness or height are required.

FIG. 6 also illustrates a coating of surface material 48 covering the exposed surface of the outer layer 47 of shot 30. Although such a coating 48, which may also be a sand-resin cement similar to cement 38 may be employed where the shot 30 is extremely small, still the exposed surfaces formed by simply impregnating the surface interstices as disclosed in FIGS. 3 and 4 are preferred, because of the dimensional stability of the shot 30.

Another method of building up shaped articles of great thickness is to fabricate the mass in lateral segments or sectors instead of vertically stacked layers.

Rather thick shaped articles may be made by partially filling the box frame 11 with iron or steel cylindrical shapes or pellets of various diameters and lengths, but larger than the shot 30 to fill the box frame 11 more rapidly. The steel shot 30 and the iron powder mixture 37 may then be added to impregnate the entire mass 32.

Since magnetic shot will not lose its magnetism unless heated above approximately 900° F., the shaped masses 32 will not be affected when a sand-resin mixture such as 36 has to be cured, and when the shaped article 32 is employed as a shell mold, since, in either case, the shaped article 32 will be heated only to a temperature in the range of 350–375° F.

It can be readily understood that if such a foundary process were employed for making a model, any alterations required in the model could be easily performed by returning the model to the apparatus to repeat the process by adding small amounts of the bonding materials 36 or 38 to any desired portion and curing the same with a minimum of time and expense.

Another feature of this invention is that the identical apparatus and process may be employed for making either a model, pattern, core box mold or molded product. The only difference between making a model and a pattern is that the pattern is made slightly larger to allow for shrinkage, and this allowance can be readily accommodated by adjustment of the templets on their supporting members.

In making relatively thin patterns in accordance with this process, the curing can be done after all the configurations have been formed by the templets. However, for relatively thick shaped articles, the silica-resin material should be progressively cured as the mass is built up, such as the layers 45, 46 and 47 of FIG. 6.

One very important feature of this invention over conventional foundry practices is the high degree of accuracy obtained in the shaped articles. A model can be made so accurately that it can serve as a guide for machining the first product. Such machining can be accomplished by use of a pantograph or by magnetic tape. Moreover, once the model has been completed, a master pattern can be made to allow for double shrinkage by reproducing the model in a size increased by a constant factor. Similarly, a production pattern can be made to allow for single shrinkage. The quality of the accuracy of the model is so great that no additional computations are necessary during the entire manufacturing process.

It will be understood, that where sand-resin cements are employed, that a higher percentage of powered resin will be employed than if the resin were liquid. Moreover, a greater ratio of resin to sand will be employed in tool making processes where a harder shaped article is desired, in contrast to production molding, such as the making of shell molds, where a smaller percentage of resin will be employed. By way of example, a 5% powdered resin will be employed in a silica resin mixture employed in production molding whereas 8½ to 20% powered resin would be employed for tool making. On the other hand, only 2% liquid resin would be employed in a silica resin mixture for production molding, and perhaps 3 to 10% liquid resin might be employed in a silica resin mixture for tool making.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. A method of making a shaped foundry article comprising:
   (a) depositing magnetic shot upon a supporting surface,
   (b) magnetizing said shot to form a workable coherent mass having an exposed surface,
   (c) then forcing a tool into said exposed surface to form a predetermined design, and
   (d) impregnating said exposed surface with a granular bonding material and
   (e) setting said bonding material to form a smooth and rigid exposed surface incorporating said predetermined design.

2. The invention according to claim 1 in which said granular material comprises a mixture of iron powder and cement.

3. The invention according to claim 2 in which said cement comprises a mixture of resin and sand.

4. The invention according to claim 3 in which said mixtures of iron powder and resin and sand impregnate all the interstices between said shot as well as said exposed surfaces.

5. A method of making a shaped foundry article comprising:
   (a) depositing a first layer of magnetic shot upon a supporting surface,
   (b) magnetizing said shot,
   (c) impregnating said first layer with a mixture of iron powder and cement comprising sand and resin,
   (d) setting said cement,
   (e) depositing a second layer of magnetic shot upon the first layer,
   (f) magnetizing said shot,
   (g) impregnating said second layer of said shot with a mixture of iron powder and cement comprising sand and resin to form a smooth exposed surface,
   (h) then forcing a tool into said exposed surface to form a predetermined design, and
   (i) setting said cement in said second layer.

6. The invention according to claim 5 further comprising applying a cement coating to said exposed surface and setting said cement.

7. A method of making a shaped foundry article comprising:
   (a) depositing a plurality of pellets upon a supporting surface to form a coherent, workable mass having interstices therebetween and an exposed surface,
   (b) impregnating said interstices with a filler material,
   (c) forcing a tool into said exposed surface to form a predetermined design,
   (d) impregnating said exposed surface with a cement mixture to form rigid and smooth design surfaces, and
   (e) setting said cement mixture.

8. The invention according to claim 7 in which said filler material is also a cement mixture, and further comprising the step of setting said filler cement mixture simultaneously with the setting of the cement mixture in said exposed surface.

9. The invention according to claim 8 in which said cement mixtures comprise a mixture of sand and 2–20% thermosetting resin, and the step of setting said cement comprises heating.

10. The invention according to claim 9 in which said pellets are spherical, each pellet being substantially larger than each grain of said sand.

11. The invention according to claim 10 in which said pellets are deposited in at least two layers.

12. The invention according to claim 11 in which substantially all of said adjacent pellets are contiguous.

References Cited by the Examiner

UNITED STATES PATENTS

| | | | |
|---|---|---|---|
| 2,057,039 | 10/36 | MacDonald | 264—223 |
| 2,188,091 | 1/40 | Baermann | 264—111 |
| 2,381,734 | 8/45 | Gantz | 106—38.9 |
| 2,706,163 | 4/55 | Fitko | 22—193 |
| 2,765,507 | 10/56 | Wolf et al. | 22—193 |
| 2,847,741 | 8/58 | Meves et al. | 22—193 |

FOREIGN PATENTS

| | | |
|---|---|---|
| 2,709 | 1875 | Great Britain. |
| 519,539 | 3/40 | Great Britain. |
| 251,954 | 11/47 | Switzerland. |

MARCUS U. LYONS, *Primary Examiner.*

MICHAEL V. BRINDISI, *Examiner.*